United States Patent
Coffey et al.

(10) Patent No.: US 9,236,919 B2
(45) Date of Patent: Jan. 12, 2016

(54) MIMO WIRELESS COMMUNICATION METHOD AND SYSTEM

(71) Applicant: REALTEK SEMICONDUCTOR CORPORATION, Hsinchu (TW)

(72) Inventors: John Timothy Coffey, San Francisco, CA (US); Der-Zheng Liu, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 94 days.

(21) Appl. No.: 14/161,567

(22) Filed: Jan. 22, 2014

(65) Prior Publication Data

US 2015/0162960 A1    Jun. 11, 2015

Related U.S. Application Data

(60) Provisional application No. 61/914,814, filed on Dec. 11, 2013.

(51) Int. Cl.
| | |
|---|---|
| *H04B 7/04* | (2006.01) |
| *H04L 5/00* | (2006.01) |
| *H04B 7/02* | (2006.01) |
| *H04W 74/08* | (2009.01) |

(52) U.S. Cl.
CPC .............. *H04B 7/0413* (2013.01); *H04B 7/024* (2013.01); *H04L 5/0032* (2013.01); *H04B 7/0404* (2013.01); *H04W 74/08* (2013.01)

(58) Field of Classification Search
None
See application file for complete search history.

(56) References Cited

U.S. PATENT DOCUMENTS

| | | | | | |
|---|---|---|---|---|---|
| 8,284,696 | B2 * | 10/2012 | Ye | ........................ | H04L 43/026 370/253 |
| 8,964,591 | B2 * | 2/2015 | Kim | ..................... | H04B 7/0626 370/208 |
| 2006/0198455 | A1 * | 9/2006 | Fujii | ..................... | H04L 1/0006 375/260 |
| 2007/0127380 | A1 * | 6/2007 | Abraham | ............ | H04L 12/5695 370/235 |
| 2008/0112351 | A1 * | 5/2008 | Surineni | ........... | H04W 74/0816 370/312 |
| 2008/0291945 | A1 * | 11/2008 | Luo | ..................... | H04J 11/0069 370/509 |
| 2009/0016263 | A1 * | 1/2009 | Kishigami | ............... | H04B 7/04 370/328 |

(Continued)

OTHER PUBLICATIONS

Relevant translation.

(Continued)

*Primary Examiner* — Candal Elpenord
(74) *Attorney, Agent, or Firm* — WPAT, P.C.; Anthony King

(57) ABSTRACT

The present invention discloses a MIMO wireless communication method functioning through a main wireless communication device and comprising: acquiring a transmission opportunity; issuing an distributed MIMO initiation frame including a transmission duration, a number Ns1 of transmission spatial stream(s), and a number Nr1 of reception spatial streams which an intended receiver is operable to process; receiving an initial portion which an attendant wireless communication device sends in response to the distributed MIMO initiation frame, or issuing the initial portion after reaching a time limit; and transmitting a distributed MIMO packet to the intended receiver while the attendant wireless communication device is allowed to transmit another distributed MIMO packet to the intended receiver or another intended receiver concurrently, wherein the sum of the number Ns1 and a number Ns2 of transmission spatial stream(s) of the attendant wireless communication device is equal to or less than the number Nr1.

26 Claims, 8 Drawing Sheets

(56) References Cited

U.S. PATENT DOCUMENTS

| | | | |
|---|---|---|---|
| 2009/0060094 A1* | 3/2009 | Jung et al. | 375/340 |
| 2010/0080173 A1* | 4/2010 | Takagi | H04L 27/0006 370/328 |
| 2010/0208781 A1* | 8/2010 | Wentink | H04B 7/0697 375/219 |
| 2011/0002319 A1* | 1/2011 | Husen et al. | 370/338 |
| 2011/0150004 A1* | 6/2011 | Denteneer | H04L 5/0023 370/476 |
| 2012/0002634 A1* | 1/2012 | Seok | 370/329 |
| 2012/0057471 A1* | 3/2012 | Amini et al. | 370/242 |
| 2012/0082200 A1 | 4/2012 | Verikoukis et al. | |
| 2012/0327838 A1* | 12/2012 | Seok | H04W 4/06 370/312 |
| 2013/0188567 A1* | 7/2013 | Wang et al. | 370/329 |
| 2015/0063190 A1* | 3/2015 | Merlin et al. | 370/312 |

OTHER PUBLICATIONS

Taiwan Office Action issued on Oct. 23, 2015 for counterpart Taiwan application No. 103140832.

The Search Report corresponding to the Oct. 23, 2015 Taiwan Office Action for counterpart Taiwan application No. 103140832.

* cited by examiner

MIMO WIRELESS COMMUNICATION METHOD AND SYSTEM

BACKGROUND OF THE INVENTION

1. Field of the Invention

The present invention relates to a multiple-input multiple-output (MIMO) wireless communication method and system, especially to a MIMO wireless communication method and system capable of improving data throughput.

2. Description of Related Art

In wireless communication, multiple-input multiple output (MIMO) is a technology to use multiple antennas at both of the transmission and reception ends for communication performance improvement. The MIMO technology can greatly increase the data throughput, and therefore some modern wireless communication standards such as IEEE 802.11n, Long Term Evolution (LTE), Worldwide Interoperability for Microwave Access (WiMAX), and etc. adopt MIMO as an important part to carry out communication. However, in consideration of the interference caused by multiple devices transmitting simultaneously, the communication standard using MIMO (e.g. IEEE 802.11n) also adopts a Carrier Sense Multiple Access (CSMA) protocol to verify the absence of other transmission before transmitting on a shared radio channel. Through CSMA, a transmitter can determine whether any other transmission is in progress by the feedback of a receiver, and thereby avoids a potential collision or interference. To determine the winner among a plurality of transmitters running after the same transmission opportunity, a contention-based protocol is adopted, which allows many transmitters of different users to use the same radio channel without pre-coordination. For example, a transmitter in compliance with IEEE 802.11n standard under such a contention-based protocol will use a backoff counter to count down, and earn the opportunity to transmit when the backoff counter reaches zero provided that the intended radio channel is clear in the meantime.

As the MIMO technology is widely deployed in wireless communication devices (e.g. those conforming to IEEE 802.11n standard) and the capability of these devices moves on, a potential waste of transmission resources is observed. In some circumstances, a receiver capable of resolving spatial streams from different transmitters at the same time is forced to rest some of its hardware or software resources due to the concern of interference and the limit of the present protocol. In other words, a current MIMO wireless communication system only allows one winner among a plurality of transmitters pursuing the same transmission opportunity to transmit at a time. If such the concern or limit could be eliminated, the data throughput of the MIMO system could be raised significantly.

SUMMARY OF THE INVENTION

In consideration of the imperfections of the prior art, an object of the present invention is to provide a multiple-input multiple-output (MIMO) wireless communication method and system capable of increasing data throughput.

Another object of the present invention is to provide a MIMO wireless communication method and system capable of joint transmission for the performance improvement in the MIMO technology.

The present invention discloses a MIMO wireless communication method to function through a main wireless communication device. An embodiment of said MIMO wireless communication method comprises the following steps: acquiring a transmission opportunity under a protocol indicating that any other device running after the same transmission opportunity has to hold off transmission without a distributed MIMO frame from the main wireless communication device; issuing a distributed MIMO initiation frame including the transmission duration of the main wireless communication device, a number Ns1 of transmission spatial stream(s) of the main wireless communication device, and a number Nr1 of reception spatial streams which an intended receiver is operable to process; receiving an initial portion which an attendant wireless communication device sends in response to the distributed MIMO initiation frame, or issuing the initial portion after reaching a predetermined condition; and after receiving or issuing the initial portion, transmitting a distributed MIMO packet to the intended receiver while the attendant wireless communication device is allowed to transmit another distributed MIMO packet to the intended receiver or another intended receiver in the transmission duration of the main wireless communication device, wherein the sum of the number Ns1 and a number Ns2 of transmission spatial stream(s) of the attendant wireless communication device is equal to or less than the number Nr1.

Another embodiment of said MIMO wireless communication method comprises the following steps: acquiring a transmission opportunity under a protocol indicating that any other device running after the transmission opportunity has to hold off transmission without a distributed MIMO frame from the main wireless communication device; listening to any signal indicating the capability of a potential attendant wireless communication device which also runs after the transmission opportunity; issuing a distributed MIMO invitation frame including the transmission duration of the main wireless communication device, a number Ns1 of transmission spatial streams of the main wireless communication device, a number Nr1 of reception spatial streams which an intended receiver is operable to process, and an invitation list to invite one or more candidate devices including the potential attendant device; and after reaching a predetermined condition or receiving a qualified acknowledgement from the one or more candidate devices, transmitting a distributed MIMO packet to the intended receiver while the potential attendant wireless communication device is allowed to transmit another distributed MIMO packet to the intended receiver or another intended receiver in the transmission duration of the main wireless communication device, wherein the sum of the number Ns1 and a number Ns2 of transmission spatial streams of the potential attendant wireless communication device is equal to or less than the number Nr1.

A further embodiment of said MIMO wireless communication method comprises the following steps: acquiring a transmission opportunity under a protocol indicating that any other device running after the transmission opportunity has to hold off transmission without permission; determining whether a number Nr1 of reception spatial streams which an intended receiver in connection with the main wireless communication device is operable to process is more than a number Ns1 of transmission spatial stream(s) of the main wireless communication device; and if the number Nr1 is more than the number Ns1, executing a joint transmission procedure which allows the main wireless communication device and an attendant wireless communication device to transmit packets concurrently provided that the sum of the number Ns1 and a number Ns2 of transmission spatial stream(s) of the attendant wireless communication device is equal to or less than the number Nr1.

Besides, the present invention discloses a MIMO wireless communication system. An embodiment of said MIMO wireless communication system comprises: a first wireless communication device possessing a transmission opportunity to passively start a joint transmission by issuing a distributed MIMO initiation frame and receiving an initial portion from a second wireless communication device, or actively start the joint transmission by issuing the distributed MIMO initiation frame and the initial portion thereafter, or actively start the joint transmission by issuing a distributed MIMO invitation frame and issuing the initial portion; and the second wireless communication device running after the transmission opportunity to participate in the joint transmission by accepting the joint transmission offer from the distributed MIMO initiation frame and issuing the initial portion, or by accepting the joint transmission offer from the distributed MIMO initiation frame and receiving the initial portion from the first wireless communication device, or by accepting the joint transmission offer from the distributed MIMO invitation frame and receiving the initial portion from the first wireless communication device; wherein the distributed MIMO initiation or invitation frame includes a number Ns1 of the transmission spatial stream(s) of the first wireless communication device and a number Nr1 of reception spatial streams which a first receiver in connection with the first wireless communication device is operable to process, and the joint transmission allows the first and second wireless communication devices to transmit distributed MIMO packets concurrently provided that the sum of the number Ns1 and a number Ns2 of transmission spatial stream(s) of the second wireless communication device is equal to or less than the number Nr1.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms of this invention filed. If any term is defined in the specification, such term should be explained accordingly. Besides, the connection between objects or events in the disclosed embodiments can be direct or indirect provided that these embodiments are still applicable under such connection. Said "indirect" means that an intermediate object or a physical space is existed between the objects, or an intermediate event or a time interval is existed between the events. In addition, the following description relates to the multiple-input multiple-output (MIMO) technology, and thus the detail known in this filed will be omitted if such detail has little to do with the features of the present invention. Furthermore, the shape, size, and ratio of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention discloses MIMO wireless communication methods and a MIMO wireless communication system. The methods and system are applicable to a lot of wireless communication devices such as those supporting IEEE 802.11 standards or the like; however, these applications are not limitations to the present invention, just for understanding. People of ordinary skill in the art can choose components or steps equivalent to those described in this specification to carry out the present invention, which means that the scope of this invention is not limited to the embodiments in the specification. On account of that some or all elements of said MIMO wireless communication system could be known, the detail of such elements will be omitted provided that this omission nowhere dissatisfies the specification and enablement requirements. Besides, said MIMO wireless communication methods can be in the form of firmware and/or software which could be carried out by a known wireless communication device (e.g. a device abiding by IEEE 802.11 standards) or a wireless device modified in accordance with the disclosure of this invention; therefore, the following description will abridge the hardware details or well-known parts of the method provided that the remaining disclosure is still enough for understanding and enablement.

Figure 1A:
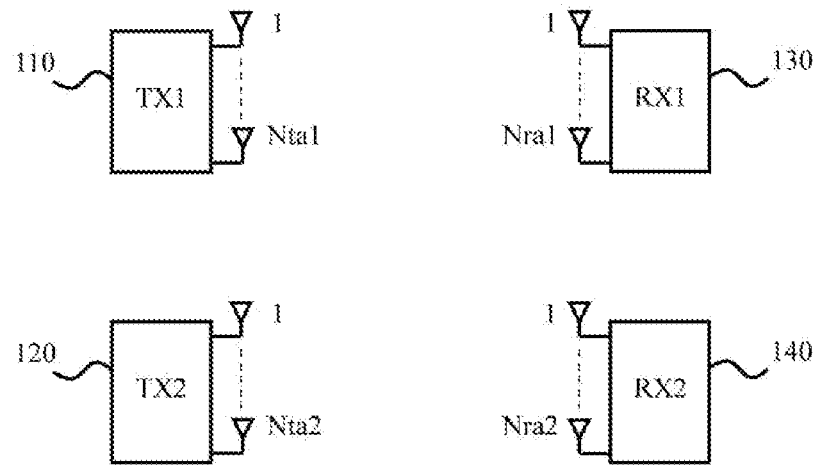
FIG. 1a illustrates a wireless network configuration.
Figure 1B:
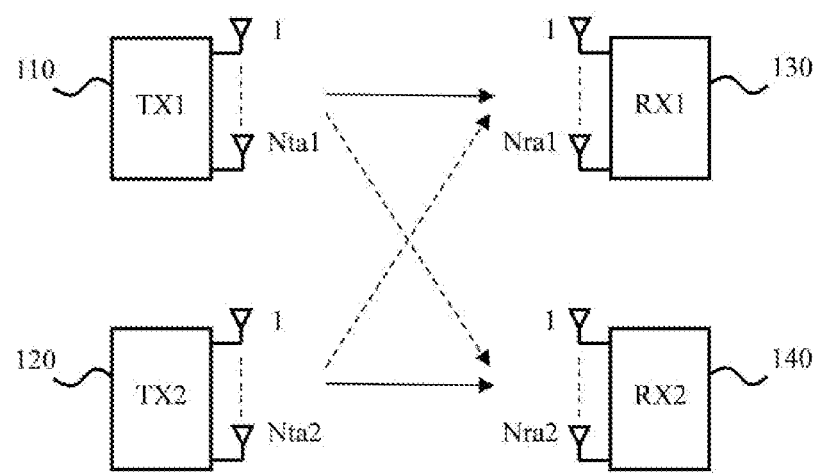
FIG. 1b illustrates a communication circumstance of the network configuration of FIG. 1.

Please refer to FIG. 1a which illustrates a wireless network configuration 100 including a first transmitter 110 (hereafter, TX1) with Nta1 antenna(s), a second transmitter 120 (hereafter, TX2) with Nta2 antenna(s), a first receiver 130 (hereafter, RX1) with Nra1 antenna(s) and a second receiver 140 (hereafter, RX2) with Nra2 antenna(s); said Nta1, Nta2, Nra1 and Nra2 are positive integers. In this network configuration 100 there exists the following communication circumstances involving two operating transmitters:

(1) As shown in FIG. 1b, TX1 and RX1 belong to the same basic service set (BSS) while TX2 and RX2 belong to another. Please note that through FIG. 1b to FIG. 1f solid lines indicate the same basic service set while dashed lines indicate separate basic service sets.

Figure 1C:
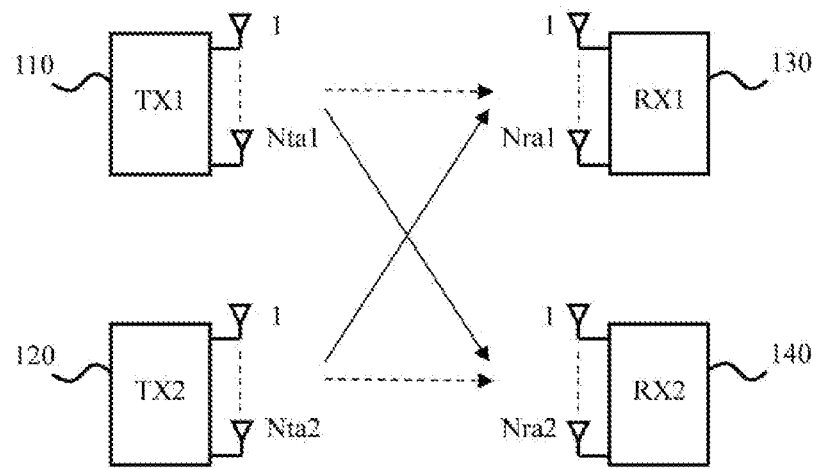
FIG. 1c illustrates another communication circumstance of the network configuration of FIG. 1.

(2) As shown in FIG. 1c, TX1 and RX2 belong to the same basic service set while TX2 and RX1 belong to another. This case is identical to case (1) in analysis, and thus only case (1) will be discussed in the following description.

Figure 1D:
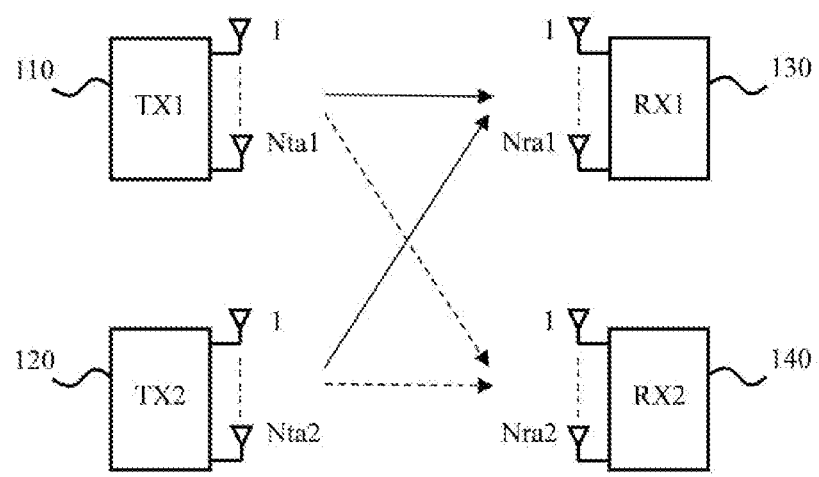
FIG. 1d illustrates a further communication circumstance of the network configuration of FIG. 1.

(3) As shown in FIG. 1d, TX1, TX2 and RX1 belong to the same basic service set while RX2 stands along.

Figure 1E:
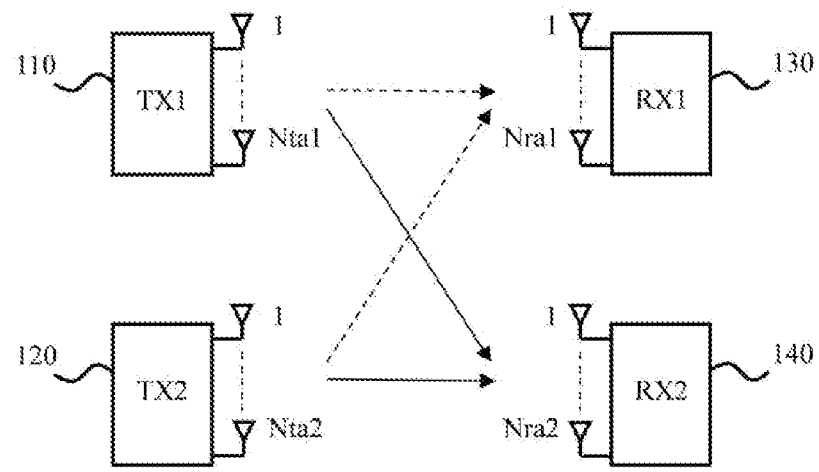
FIG. 1e illustrates a further communication circumstance of the network configuration of FIG. 1.

(4) As shown in FIG. 1e, TX1, TX2 and RX2 belong to the same basic service set while RX1 is not paired with any of TX1 and TX2. This case is identical to case (3) in analysis, and therefore only case (3) will be discussed in the following description.

Figure 1F:
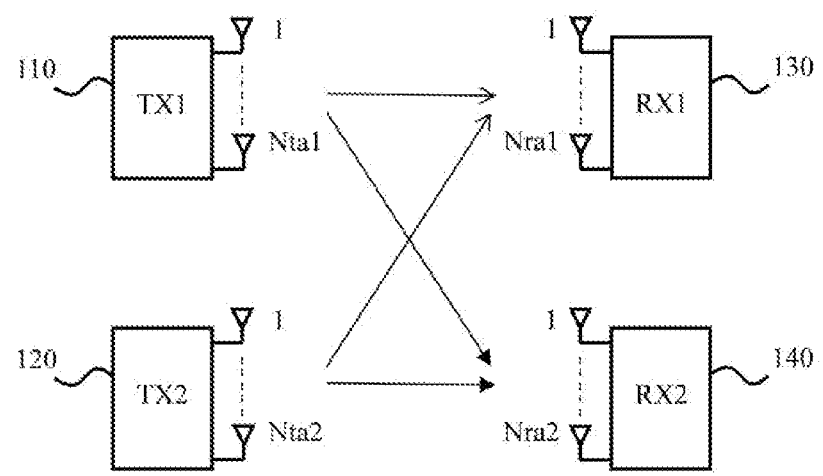
FIG. 1f illustrates a further communication circumstance of the network configuration of FIG. 1.

(5) As shown in FIG. 1f, TX1, TX2 and RX1 belong to the same basic service set while TX1, TX2 and RX2 belong to another, which means that each of TX1 and TX2 will transmit packets to both of RX1 and RX2.

In case (1), under the current MIMO protocol, if TX1 gets the transmission opportunity, it will be allowed to transmit packets to RX1 while TX2 has to hold off transmission and try to seize a following transmission opportunity. On the contrary, if TX2 wins the transmission opportunity, it will be allowed to transmit packets to RX2 while TX1 has to wait for the next transmission opportunity. However, if both RX1 and RX2 are capable of resolving all spatial streams from TX1 and TX2, the waiting will become a waste of data throughput; but if only one or none of RX1 and RX2 is capable of resolving the total spatial streams from TX1 and TX2, such waiting will be unavoidable.

In case (3), under the current MIMO protocol, if TX1 gets the transmission opportunity, it will be allowed to transmit packets to RX1; in the meantime, TX2 has to wait. On the contrary, if TX2 wins the transmission opportunity, it will be allowed to transmit packets to RX1 while TX1 has to run after the next transmission opportunity. However, if both RX1 and RX2 are capable of resolving all spatial streams from TX1 and TX2, the waiting will no longer be necessary; but if any of RX1 and RX2 is incapable of resolving the total spatial streams from TX1 and TX2, such waiting will be required.

Similarly, in case (5), under the current MIMO protocol, if TX1 gets the transmission opportunity, it will be allowed to transmit packets to RX1 and RX2 while TX2 has to hold off transmission until it wins a following transmission opportunity. On the contrary, if TX2 acquires the transmission opportunity, it will be allowed to transmit packets to RX1 and RX2 while TX1 has to wait for another transmission opportunity. However, if both RX1 and RX2 are capable of resolving all spatial streams from TX1 and TX2, the waiting will be a waste; but if RX1 or RX2 is incapable of resolving the total spatial streams from TX1 and TX2, such waiting will be necessary. Please note that more communication circumstances of other network configurations can be derived from cases (1), (3) and (5) by people of ordinary skill in the art, and thus repeated or redundant illustration will be omitted here.

Figure 2:
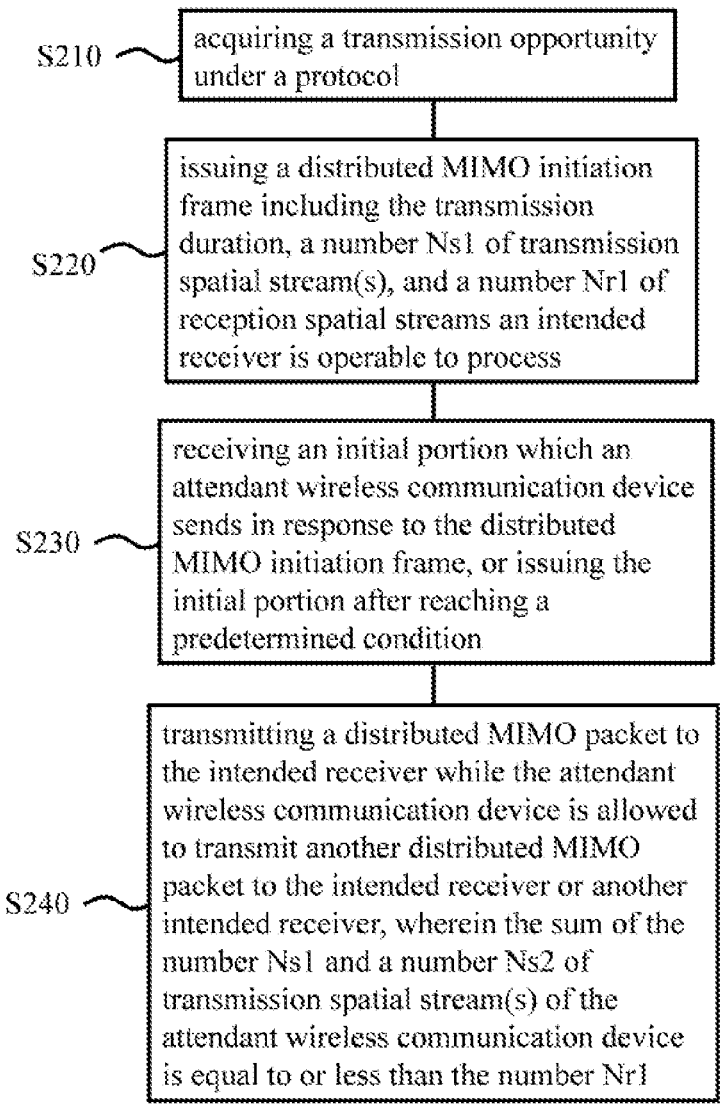
FIG. 2 illustrates an embodiment of a MIMO wireless communication method of the present invention.
Figure 3:
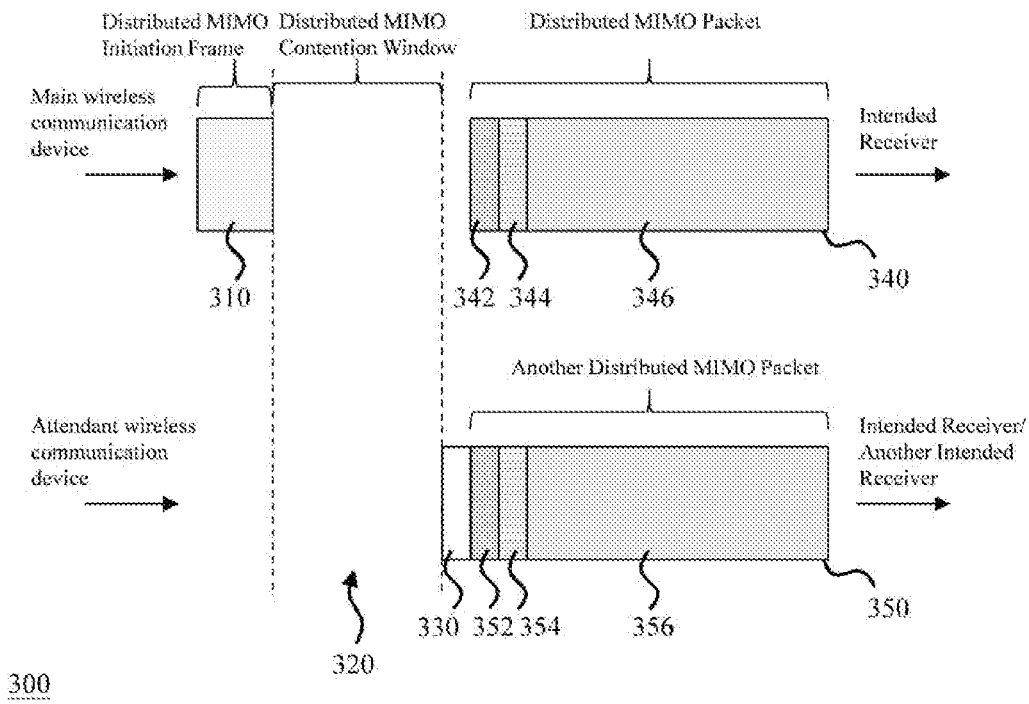
FIG. 3 illustrates a signal delivery scenario based on the embodiment of FIG. 2.
Figure 4:
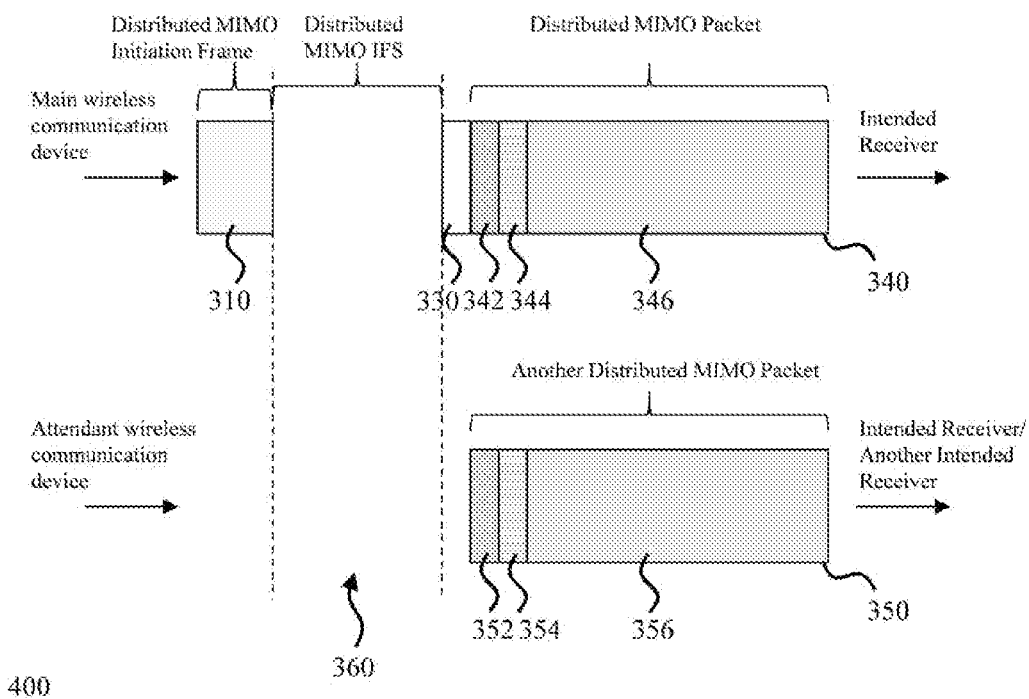
FIG. 4 illustrates another signal delivery scenario based on the embodiment of FIG. 2.

In view of the aforementioned possible waste of data throughput, the present invention provides a MIMO wireless communication method to tackle this problem. Please refer to FIGS. 2-4 in which FIG. 2 illustrates an embodiment of said MIMO wireless communication method, FIG. 3 illustrates a signal delivery scenario 300 based on the embodiment of FIG. 2, FIG. 4 illustrates another signal delivery scenario 400 based on the embodiment of FIG. 2. Said embodiment functions through a main wireless communication device (e.g. TX1 through FIG. 1a to FIG. 1f), and comprises the following steps:

Step S210: acquiring a transmission opportunity under a protocol indicating that any other device running after the transmission opportunity has to hold off transmission without a distributed MIMO frame from the main wireless communication device. Said protocol, for example, is a contention-based protocol for IEEE 802.11 standards; and said distributed MIMO frame is the distributed MIMO initiation frame of Step S220 or its equivalent such as a control frame indicating a joint transmission offer or a transmission opportunity transference.

Step S220: issuing a distributed MIMO initiation frame (e.g. the frame 310 in FIG. 3 or FIG. 4) including the transmission duration of the main wireless communication device, a number Ns1 of transmission spatial stream(s) of the main wireless communication device, and a number Nr1 of reception spatial streams an intended receiver (e.g. RX1 through FIG. 1a to FIG. 1f) is operable to process. Please note that one transmission spatial stream could be sent through two or more antennas, and thus the number Ns1 should be equal to or less than the antenna number of the main wireless communication device (e.g. Nta1 through FIG. 1a to FIG. 1f). Please also note that one reception spatial stream should be received through its dedicated antenna, and therefore the number Nr1 should be equal to or less than the antenna number of said intended receiver (e.g. Nra1 through FIG. 1a to FIG. 1f).

Step S230: receiving an initial portion (e.g. the initial portion 330 in FIG. 3) which an attendant wireless communication device (e.g. TX2 through FIG. 1a to FIG. 1f) sends in response to the distributed MIMO initiation frame, or issuing the initial portion (e.g. the initial portion 330 in FIG. 4) after reaching a predetermined condition. In this embodiment, if the attendant wireless communication device sends the initial portion in response to the distributed MIMO initial frame (i.e. the scenario of FIG. 3), it will be the one who uses up the remaining communication resources within a duration (e.g. the distributed MIMO contention window 320 of FIG. 3) and therefore eligible to send the initial portion to other devices including the main wireless communication device for the start of transmission, or it will be the one who is qualified to send the initial portion in accordance with the distributed MIMO initiation frame (which may further include a threshold such as a requirement on the minimum remaining resources for the attendant wireless communication device to determine whether to issue the initial portion or not) no matter whether the remaining communication resources have been used up. On the other side, if the main wireless communication device issues the initial portion after reaching the predetermined condition (i.e. the scenario of FIG. 4), it implies that all devices including the attendant wireless communication device participating in the joint transmission have not use up the remaining resources or only the main wireless communication device is allowed to start the transmission. Said predetermined condition, for example, could be a time limit such as a distributed MIMO interframe spacing (Distributed MIMO IFS) 360 between the distributed MIMO initiation frame 310 and the initial portion 330 as shown in FIG. 4, which can prevent an undue waiting for a coming device or make the main wireless communication device be the only one capable of commencing the transmission. The initiation portion may be integrated with the to-be-transmitted packet (e.g. the distributed MIMO packet of step S240) of the attendant or main wireless communication device, and should be long enough to allow all participative devices to be ready for transmission or include buffer or transition symbols for the turnaround time of the participative devices.

Step S240: after receiving or issuing the initial portion, transmitting a distributed MIMO packet (e.g. the packet 340 in FIG. 3 or FIG. 4) to the intended receiver while the attendant wireless communication device is allowed to transmit another distributed MIMO packet (e.g. the packet 350 in FIG. 3 or FIG. 4) to the intended receiver (e.g. RX1 through FIG. 1a to FIG. 1f) or another intended receiver (e.g. RX2 through FIG. 1a to FIG. 1f) in the transmission duration of the main wireless communication device, wherein the sum of the number Ns1 and a number Ns2 of transmission spatial stream(s) of the attendant wireless communication device is equal to or less than the number Nr1. To be more specific, the distributed MIMO packet and said another distributed MIMO packet are transmitted concurrently in this embodiment, and the transmission duration of the main wireless communication device is equal to or longer than the transmission duration of the attendant wireless communication device. In an alternative embodiment, the main wireless transmission device may plan to transmit a plurality of packets including the distributed MIMO packet in its transmission duration; in this case, the attendant wireless communication device can transmit said another distributed MIMO packet later than or prior to the distributed MIMO packet within the overall transmission duration. Regarding the current embodiment again, if only one receiver (i.e. the intended receiver) is available to the main and attendant communication devices, the requirement on spatial streams that the sum of the number Ns1 and the number Ns2 is equal to or less than the number Nr1 will be enough; however, if another receiver (i.e. the another intended receiver) is available to the main and attendant communication devices, a further requirement on spatial streams that the sum of the number Ns1 and the number Ns2 is equal to or less than a number Nr2 of reception spatial streams said another intended receiver is operable to process will be required. In brief, every receiver available to any transmitter participating in the joint transmission should be able to process at least any many as the total transmission spatial streams of all participative transmitters.

In the current embodiment, the distributed MIMO packet from the main wireless communication device includes: training symbols for detection and synchronization (e.g. training symbols 342 in FIG. 3 or FIG. 4); training symbols for channel estimation (e.g. training symbols 344 in FIG. 3 or FIG. 4); and data (e.g. data 346 in FIG. 3 or FIG. 4). Similarly, said another distributed MIMO packet from the attendant wireless communication device includes the same compositions (e.g. training symbols 352 for synchronization, training symbols 354 for channel estimation and data 356 in FIG. 3 or FIG. 4). Through these training symbols, synchronizations between transmission and reception ends can be realized and channel estimations can be executed by the reception end(s). More specifically, the synchronization states of the main and attendant wireless communication devices are better to be approximate to thereby enable a normal receiver to carry out demodulation without suffering inter-carrier interference (ICI); however, a specially designed receiver such as one having two sets of demodulation circuits or a timing compensation circuit may be used for asynchronous events in an alternative embodiment of the present invention. In addition, each receiver available to the main and attendant wireless communication devices should be able to estimate each of the spatial stream channels, so as to take care of all the spatial streams from different transmitters at the same time although some or all of the spatial streams for other receivers will be resolved and then discarded.

Please note that each of the main and attendant wireless communication devices may or may not support MIMO, but each of the receivers available to them has to support MIMO to fulfill a joint transmission (i.e. the simultaneous transmission of the main and attendant wireless communication devices). More specifically, each receiver in interest must be capable of resolving all transmission spatial streams from the transmitters participating in the joint transmission. Please also note that the main or attendant wireless communication device who is going to give out the initial portion may carry out a collision detection to verify that no other attendant device has attempted to send the initial portion for the start of transmission; however this is not essential for the present invention to work. Said collision detection, for example, is a detection in compliance with the existing contention-based protocol or the like, which may be realized by sending out a Request to Send (RTS) frame and receiving a Clear to Send (CTS) frame from those who heard and replied to the RTS frame. Besides, after transmitting the distributed MIMO packets, the main and attendant wireless communication devices are supposed to receive acknowledgement signals from their intended receiver(s), or else retransmission may be required. Said acknowledgement mechanism could be done in an existing way, and is known to those of ordinary skill in the art. Furthermore, the terms such as "distributed MIMO initiation frame", "distributed MIMO packet", "initial portion", and etc. in this specification are illustrative for understanding, not to limit this invention to an unusual signal format.

Figure 5:
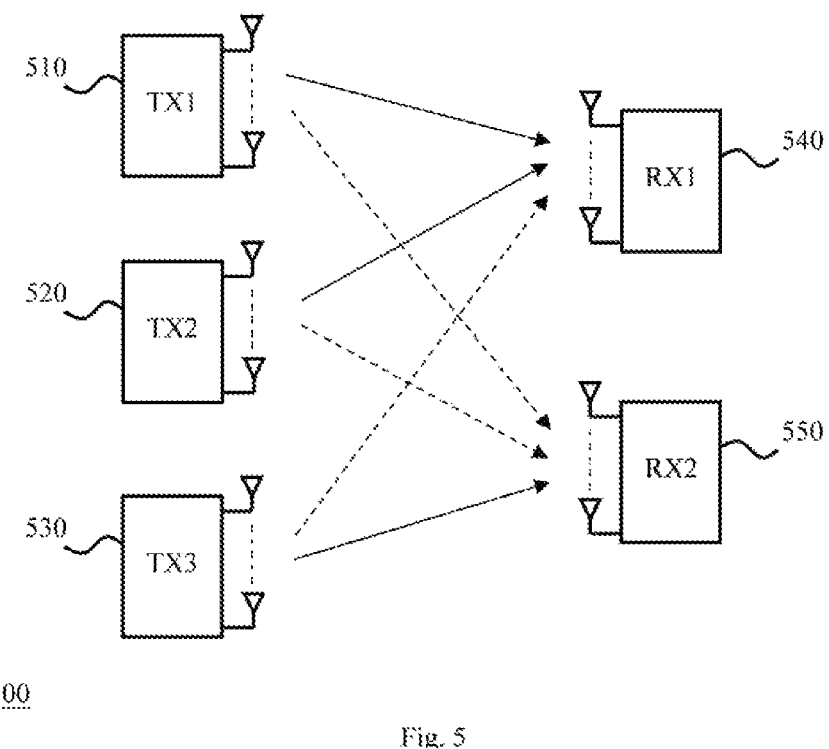
FIG. 5 illustrates another wireless network configuration.

In light of the above, people of ordinary skill in the art can appreciate how other network configurations may carry out the joint transmission of the present invention. For instance, as shown in FIG. 5, a network configuration 500 is established based on three transmitters 510, 520, 530 (hereafter, TX1, TX2, TX3, each of which has at least one antenna) and two receivers 540, 550 (hereafter, RX1, RX2, each of which has at least one antenna), and transmitters TX1, TX2 and receiver RX1 belong to the same service set while transmitter TX3 and receiver RX2 belong to another. In this network, TX1 plays the role of the main wireless communication device through the aforementioned steps S210 to S240; TX2 whose backoff counter reaches zero within a time limit defined by TX1 can choose to participate in the joint transmission and issue a second distributed MIMO initiation frame in response to the distributed MIMO initiation frame from TX1 provided that TX1 and TX2 do not use up the total communication resources, that is to say each of RX1 and RX2 still having one or more unused reception chains (i.e. unused antenna(s) here) for another transmitter to use; and TX3 whose backoff counter reaches zero thereafter within the time limit defined by TX1 or another one defined by TX2 can choose to participate in the joint transmission in response to the second distributed MIMO initiation frame from TX2 and then issue the initial portion, that is to say TX3 playing the role similar to the attendant wireless communication device through steps S210 to S240. In this instance, since TX3 is the one who uses up the remaining communication resources or is qualified to start the joint transmission, there is no need for TX3 to send a further distributed MIMO initiation frame; however, if TX3 is an intermediate transmitter like TX2, it will function as TX2 does, which means that it can issue a third distributed MIMO initiation frame for the other transmitters in the network configuration 500. Please note that the second distributed MIMO initiation frame from TX2 may include not only the resource information of TX2 but also the resource information of TX1, which implies that TX3 can choose to determine whether there is enough remaining space for it according to the second distributed MIMO initiation frame from TX2 regardless of that from TX1; but if the second distributed MIMO initiation frame of TX2 only carries TX2 information, TX3 has to make decision by calculating the remaining resources according to both the initiation frames from TX1 and TX2. Please note that another mechanism instead of the backoff counter can be used in an alternative embodiment of the present invention provided that all transmitters participating in the joint transmission consent to such mechanism.

Based on the above description, a plurality of modifications can be introduced into the present method invention. Said modifications at least include the following cases:

(1) if the MIMO wireless communication method plans to transmit many packets including the foresaid distributed MIMO packet by the main wireless communication device, it can divide the transmission duration of the main wireless communication device into a plurality of sub-durations, assign a dedicated sub-duration to each of the packets, and indicate the order and sub-duration of each packet by the distributed MIMO initiation frame. Accordingly, the attendant wireless communication device can participate in some or all of the sub-durations in view of the packet(s) it's going to send. Please note that it's also practicable that the attendant wireless communication device executes the above-mentioned division, assignment, and indication steps for another participative device to follow.

(2) Under the same assumption of case (1), the MIMO wireless communication method may define one or more intervals between two of the adjacent sub-durations during which another attendant wireless communication device is allowed to decide whether to participate in the joint transmission, i.e. transmit in some or all of the rest of the sub-durations.

(3) Under the same assumption of case (1), the MIMO wireless communication method may transfer one or more of the sub-durations to a designated wireless communication device, so that the designated wireless communication device in place of the main wireless communication device is allowed to transmit during the transferred one or more sub-durations.

(4) Under the same assumption of case (1), the MIMO wireless communication method may plan to transmit packets to different receivers respectively and write in the address information into the distributed MIMO initiation frame; in the meantime, since the different receivers may have distinct reception capabilities, the remaining communication resource for each sub-duration might be different. As a result, the attendant wireless communication device should abide by the least remaining resource among the overall sub-durations to decide whether to join in the transmission, or take some or all of the resource conditions sufficient for itself into account for decision. The attendant wireless communication device itself may also plan to address packets to different receivers; consequently, a following participative device should do the same consideration as the attendant wireless communication device does.

(5) The MIMO wireless communication method may transmit a supplementary control frame including a renewed transmission duration for additional packet transmission to the intended receiver when the main wireless communication device still holds the transmission opportunity. For example, the MIMO wireless communication method can reserve a time interval long enough to cover the initial transmission duration via its distributed MIMO initiation frame or any known and appropriate method from the underlying protocol, and transmit said renewed transmission duration after finishing the initial transmission duration within the overall reserved time interval. Such kind of renewed information can be sent again and again as long as it's sent in the overall reserved time interval.

(6) The MIMO wireless communication method may set the number Ns1 more than that it really want. To be more specific, the number Ns1 could be more than an effective number of transmission spatial stream(s) through which the distributed MIMO packet or packet from the main wireless communication device is transmitted. This modification can leave the intended receiver a margin to process signals.

(7) The MIMO wireless communication method may also set the number Nr1 less than it really need. More specifically, the number Nr1 could be less than an effective number of reception spatial streams which the intended receiver is able to process. Similarly, this modification can reserve a margin for the intended receiver.

(8) In the MIMO wireless communication method, the distributed MIMO initiation frame may further include: a requirement for avoiding slowing the main wireless communication device down. For instance, such a requirement may ask some or all of the transmitters participating in the joint transmission to reduce their contention windows (e.g. the minimum value of the backoff counter) for the subsequent channel access, agree to share their transmission resources as the main wireless communication device does once they get the transmission opportunity, or ask for no preferential treatment.

(9) The transmission spatial streams of the attendant wireless communication device through steps S210 to S240 are those that cannot be neglected in the whole joint transmission framework. If some transmission spatial stream from another participative transmitter attending before the attendant wireless communication device is found low and negligible by a participative receiver, the participative receiver may report this to the attendant wireless communication device to allow it to ignore such negligible stream in its decision process.

Figure 6:
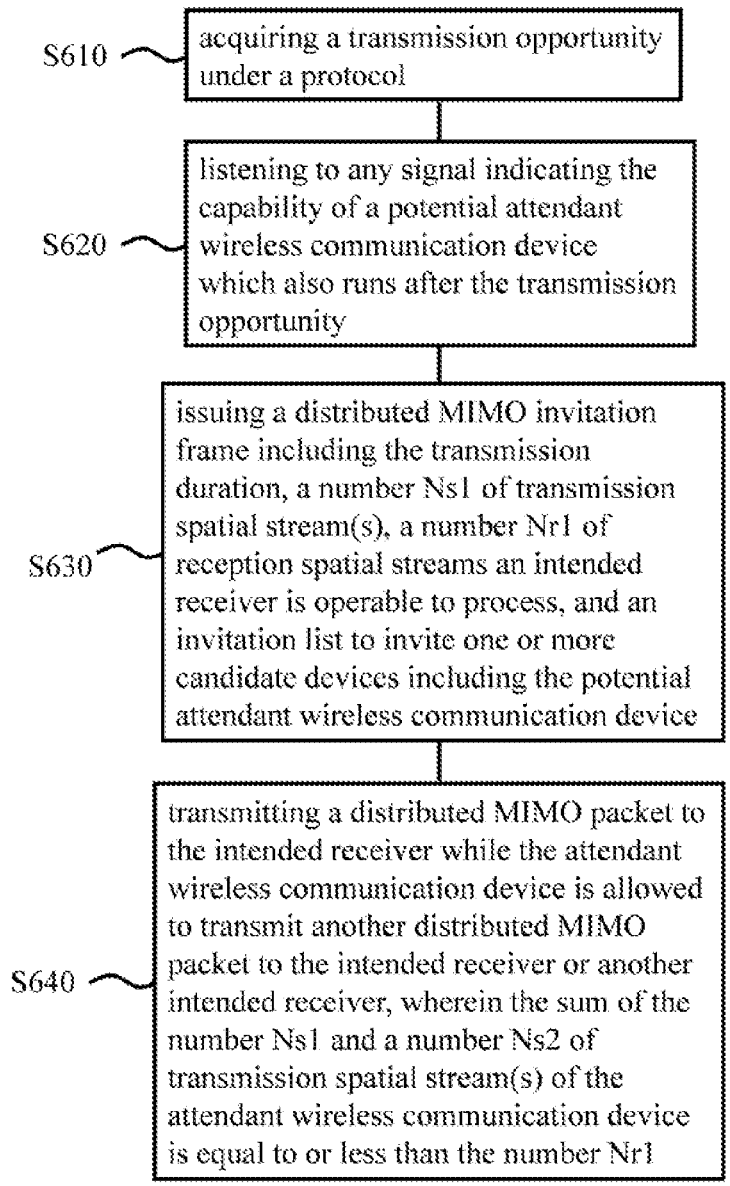
FIG. 6 illustrates an embodiment of another MIMO wireless communication method of the present invention.

The fore-disclosed method invention, carried out by a main wireless communication device, requests other devices running after the same transmission opportunity to decide whether to participate in the joint transmission according to the communication resources and their own demands, but sets no qualification threshold. To give the main wireless communication device more flexibility on joint transmission, as shown in FIG. 6, the present invention provides another MIMO wireless communication method functioning through the main wireless communication device (e.g. TX1 through FIG. 1a to FIG. 1f) and comprising the following steps:

Step S610: acquiring a transmission opportunity under a protocol indicating that any other device running after the same transmission opportunity has to hold off transmission without a distributed MIMO frame from the main wireless communication device. Said protocol, for example, is a contention-based protocol for IEEE 802.11 standards; and said distributed MIMO frame is the distributed MIMO invitation frame of Step S630 or its equivalent (e.g. a control frame indicating a joint transmission offer or a transmission opportunity transference).

Step S620: listening to any signal indicating the capability of a potential attendant wireless communication device (e.g. TX2 through FIG. 1a to FIG. 1f) which also runs after the transmission opportunity.

Step S630: issuing a distributed MIMO invitation frame including the transmission duration of the main wireless communication device, a number Ns1 of transmission spatial streams of the main wireless communication device, a number Nr1 of reception spatial streams which an intended receiver (e.g. RX1 through FIG. 1a to FIG. 1f) is operable to process, and an invitation list to invite one or more candidate devices including the potential attendant wireless communication device. Said invitation list could be determined in light of the capabilities of the one or more candidate devices.

Step S640: after reaching a predetermined condition or receiving a qualified acknowledgement from the one or more candidate devices (e.g. the acknowledgement from the potential attendant wireless communication device), transmitting a distributed MIMO packet to the intended receiver while the potential attendant wireless communication device is allowed to transmit another distributed MIMO packet to the intended receiver or another intended receiver (e.g. RX2 through FIG. 1a to FIG. 1f) within the transmission duration of the main wireless communication device, wherein the sum of the number Ns1 and a number Ns2 of transmission spatial streams of the potential attendant wireless communication device is equal to or less than the number Nr1. In this embodiment, said predetermined condition, for example, is a time limit; said qualified acknowledgment could be the initial portion described before; and said distributed MIMO packet may include said initial portion if it is sent in response to the predetermined condition. Furthermore, no matter whether the potential attendant wireless communication device is the last one who participate in the joint transmission, the invitation list may have taken the capabilities of attendants into consideration to prevent the overuse of the communication resources, which means that all candidate devices just have to decide whether to attend or not with or without answering to the invitation. However, in an alternative embodiment, the invitation list may cover the candidate devices more than the remaining resources can sustain; in the meantime, candidate devices who responds to the distributed MIMO invitation frame early may earn the chance of the joint transmission, or candidate devices who has higher rankings may enter the joint transmission list first while those having lower rankings have to see if any candidate device of a higher ranking gives up its chance.

Since people of ordinary skill in the art can fully understand the current embodiment and the modifications thereto by referring to FIG. 1a to FIG. 5 and the descriptions thereof, repeated and redundant explanation is therefore omitted provided that the remaining description is still sufficient for enablement and disclosure requirement. In fact, all the modifications applicable to the previous embodiments are also applicable here.

Figure 7:
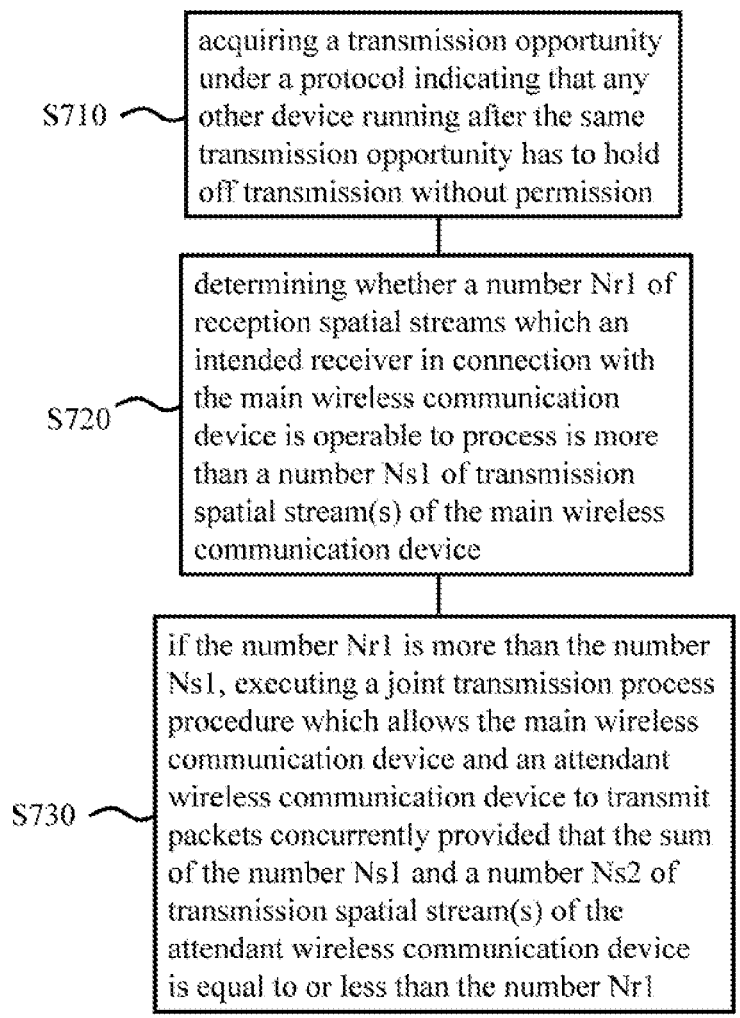
FIG. 7 illustrates an embodiment of a further MIMO wireless communication method of the present invention.

Besides, there exists a chance that the main wireless communication device itself uses up the total communication resources, that is to say the transmission spatial streams Ns1 of the main wireless communication device is equal to the reception spatial streams the intended receiver is able to process. Under this circumstance, it will be meaningless for the main wireless communication device to offer a joint transmission opportunity. Therefore, the present invention further discloses a MIMO wireless communication method to deal with such kind of circumstances. As shown in FIG. 7, an embodiment of said method functioning through the main wireless communication device (e.g. TX1 through FIG. 1a to FIG. 1f) comprises:

Step 710: acquiring a transmission opportunity under a protocol indicating that any other device running after the same transmission opportunity has to hold off transmission without permission. Said permission may be the foresaid distributed MIMO initiation or invitation frame, or its equivalent.

Step S720: determining whether a number Nr1 of reception spatial streams which an intended receiver in connection with the main wireless communication device is operable to process is more than a number Ns1 of transmission spatial stream(s) of the main wireless communication device. However, if the main wireless communication device is willing to carry out a joint transmission procedure anyway, this step may become unnecessary.

Step S730: if the number Nr1 is more than the number Ns1, executing a joint transmission procedure which allows the main wireless communication device and an attendant wireless communication device to transmit packets concurrently provided that the sum of the number Ns1 and a number Ns2 of transmission spatial stream(s) of the attendant wireless communication device is equal to or less than the number Nr1.

In this embodiment, if the attendant wireless communication device intends to send packets to a receiver other than the intended receiver, another requirement that the sum of the number Ns1 and the number Ns2 is equal to or less than a number Nr2 of reception spatial streams said receiver in connection with the attendant wireless communication device is operable to process is needed. Furthermore, the transmission duration of the main wireless communication device is supposed to be equal to or longer than the transmission duration of the attendant wireless communication device to thereby avoid encumbering the initiator device, i.e. the main wireless communication device; however, this limitation could be optional.

Similarly, because people of ordinary skill in the art can fully understand the current embodiment and the modifications thereto by referring to FIG. 1a to FIG. 6 and the descriptions thereof, repeated and redundant explanation is therefore omitted. Actually, this embodiment, step S720 especially, is applicable to most of the fore-disclosed embodiments.

In addition to the MIMO wireless communication methods, the present invention also discloses a MIMO wireless communication system. An embodiment of said system comprises: a first wireless communication device (e.g. TX1 through FIG. 1a to FIG. 1f) possessing a transmission opportunity to passively start a joint transmission by issuing a distributed MIMO initiation frame and receiving an initial portion from a second wireless communication device (e.g. TX2 through FIG. 1a to FIG. 1f), or actively start the joint transmission by issuing the distributed MIMO initiation frame and the initial portion thereafter, or actively start the joint transmission by issuing a distributed MIMO invitation frame and issuing the initial portion; and the second wireless communication device running after the same transmission opportunity to participate in the joint transmission by accepting the joint transmission offer from the distributed MIMO initiation frame and issuing the initial portion, or by accepting the joint transmission offer from the distributed MIMO initiation frame and receiving the initial portion from the first wireless communication device, or by accepting the joint transmission offer from the distributed MIMO invitation frame and receiving the initial portion from the first wireless communication device, wherein the distributed MIMO initiation or invitation frame in effect here includes a number Ns1 of the transmission spatial stream(s) of the first wireless communication device and a number Nr1 of reception spatial streams which a first receiver (e.g. RX1 through FIG. 1a to FIG. 1f) in connection with the first wireless communication device is operable to process, and the joint transmission allows the first and second wireless communication devices to transmit distributed MIMO packets concurrently provided that the sum of said number Ns1 and a number Ns2 of transmission spatial stream(s) of the second wireless communication device is equal to or less than said number Nr1.

In this embodiment, if the second wireless communication device belongs to another basic service set with a second receiver (e.g. RX2 through FIG. 1a to FIG. 1f), another requirement that the sum of the number Ns1 and the number Ns2 is equal to or less than a number Nr2 of reception spatial streams which said second receiver is operable to process is required. Furthermore, in order to simplify the demodulation for the receiver(s), the synchronization states of the first and second wireless communication devices are better to be approximate; moreover, channel estimation for each of the transmission spatial streams of the first and second wireless communication devices should be available to the first receiver or the first and second receivers, so as to enable the joint transmission smoothly.

Similarly, those of ordinary skill in the art can appreciate the full figure of the current embodiment and the modifications thereto by referring to FIG. 1a to FIG. 7 and the descriptions thereof, repeated and redundant explanation is therefore omitted. In practice, the aforementioned three MIMO wireless communication methods are applicable to this embodiment.

To sum up, the MIMO wireless communication methods and system enhance the data throughput by offering a joint transmission opportunity without altering the basis of the existing MIMO protocol, which means that the present invention is compatible with the existing MIMO system. Briefly, the present invention comprises at least the following advantages:

(1) applicable even when transmitters belong to different basic service sets and are not authenticated by each other or any third device;
(2) compatible with devices that do not support the joint transmission to thereby keep the overall operation of network unaffected;
(3) accepting a range of distinct packet sizes and/or traffic characteristics in different spatial streams;
(4) allowing efficient and flexible negotiations on transmission opportunities between different transmitters;
(5) compatible with a CSMA-based protocol, existing quality of service (QOS) mechanisms for determining the foresaid contention window, and common features of other base protocols;
(6) compatible with transmitters using transmit beamforming (TxBF), space-time block codes (STBC), downlink multi-user MIMO (DL MU-MIMO) and other enhanced modes which have further-processed spatial streams.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A multiple-input multiple-output (MIMO) wireless communication method to function through a main wireless communication device, comprising:
  acquiring a transmission opportunity under a protocol indicating that any other device running after the transmission opportunity has to hold off transmission without a distributed MIMO frame from the main wireless communication device;
  issuing a distributed MIMO initiation frame including the transmission duration of the main wireless communication device, a first number of transmission spatial stream(s) of the main wireless communication device, and a first number of reception spatial streams which an intended receiver is operable to process;
  receiving an initial portion which an attendant wireless communication device sends in response to the distributed MIMO initiation frame, or issuing the initial portion after reaching a predetermined condition; and
  after receiving or issuing the initial portion, transmitting a distributed MIMO packet to the intended receiver while the attendant wireless communication device is allowed to transmit another distributed MIMO packet to the intended receiver or another intended receiver in the transmission duration of the main wireless communication device,
  wherein the sum of the first number of transmission spatial stream(s) and a second number of transmission spatial stream(s) of the attendant wireless communication device is equal to or less than the first number of reception spatial streams.

2. The MIMO wireless communication method of claim 1, wherein the transmission duration of the main wireless communication device is equal to or longer than the transmission duration of the attendant wireless communication device.

3. The MIMO wireless communication method of claim 1, wherein the transmission duration of the main wireless communication device includes a plurality of sub-durations for different packets including the distributed MIMO packet.

4. The MIMO wireless communication method of claim 3, further comprising:
  defining an interval between two of the adjacent sub-durations during which another attendant wireless communication device is allowed to decide whether to transmit in the rest of the sub-durations.

5. The MIMO wireless communication method of claim 3, further comprising:
  transferring one or more of the sub-durations to a designated wireless communication device, so that the designated wireless communication device in place of the main wireless communication device is allowed to transmit during the transferred one or more sub-durations.

6. The MIMO wireless communication method of claim 1, further comprising:
  transmitting a supplementary control frame including a renewed transmission duration of the main wireless communication device to the intended receiver when still holding the transmission opportunity.

7. The MIMO wireless communication method of claim 1, wherein the first number of transmission spatial stream(s) is more than an effective number of transmission spatial stream(s) through which the distributed MIMO packet is transmitted.

8. The MIMO wireless communication method of claim 1, wherein the first number of reception spatial streams is less than an effective number of reception spatial streams which the intended receiver is operable to process.

9. The MIMO wireless communication method of claim 1, wherein the sum of the first number of transmission spatial stream(s) and the second number of transmission spatial stream(s) is equal to or less than a second number of reception spatial streams which the another intended receiver is operable to process.

10. The MIMO wireless communication method of claim 1, wherein the distributed MIMO initiation frame further includes: a requirement for avoiding slowing the main wireless communication device down.

11. A multiple-input multiple output (MIMO) wireless communication method to function through a main wireless communication device, comprising:
  acquiring a transmission opportunity under a protocol indicating that any other device running after the transmission opportunity has to hold off transmission without a distributed MIMO frame from the main wireless communication device;

listening to any signal indicating the capability of a potential attendant wireless communication device which also runs after the transmission opportunity;

issuing a distributed MIMO invitation frame including the transmission duration of the main wireless communication device, a first number of transmission spatial streams of the main wireless communication device, a first number of reception spatial streams which an intended receiver is operable to process, and an invitation list to invite one or more candidate devices including the potential attendant wireless communication device; and after reaching a predetermined condition or receiving a qualified acknowledgement from the one or more candidate devices, transmitting a distributed MIMO packet to the intended receiver while the potential attendant wireless communication device is allowed to transmit another distributed MIMO packet to the intended receiver or another intended receiver in the transmission duration of the main wireless communication device, wherein the sum of the first number of transmission spatial streams and a second number of transmission spatial streams of the potential attendant wireless communication device is equal to or less than the first number of reception spatial streams.

12. The MIMO wireless communication method of claim 11, wherein the transmission duration of the main wireless communication device is equal to or longer than the transmission duration of the potential attendant wireless communication device.

13. The MIMO wireless communication method of claim 11, wherein the transmission duration of the main wireless communication device includes a plurality of sub-durations for different packets including the distributed MIMO packet.

14. The MIMO wireless communication method of claim 13, further comprising:

defining an interval between two of the adjacent sub-durations during which another attendant wireless communication device is allowed to decide whether to transmit in the rest of the sub-durations.

15. The MIMO wireless communication method of claim 13, further comprising:

transferring one or more of the sub-durations to a designated wireless communication device, so that the designated wireless communication device in place of the main wireless communication device is allowed to transmit during the transferred one or more sub-durations.

16. The MIMO wireless communication method of claim 11, further comprising:

transmitting a supplementary control frame including a renewed transmission duration of the main wireless communication device to the intended receiver when still holding the transmission opportunity.

17. The MIMO wireless communication method of claim 11, wherein the first number of transmission spatial streams is more than an effective number of transmission spatial stream(s) through which the distributed MIMO packet is transmitted.

18. The MIMO wireless communication method of claim 11, wherein the first number of reception spatial streams is less than an effective number of reception spatial streams which the intended receiver is operable to process.

19. The MIMO wireless communication method of claim 11, wherein the sum of the first number of transmission spatial streams and the second number of transmission spatial streams is equal to or less than a second number of reception spatial streams which the another intended receiver is operable to process.

20. The MIMO wireless communication method of claim 11, wherein the distributed MIMO invitation frame further includes: a requirement for avoiding slowing the main wireless communication device down.

21. A multi-input multiple-output (MIMO) wireless communication method to function through a main wireless communication device, comprising:

acquiring a transmission opportunity under a protocol indicating that any other device running after the transmission opportunity has to hold off transmission without permission;

determining whether a first number of reception spatial streams which an intended receiver in connection with the main wireless communication device is operable to process is more than a first number of transmission spatial stream(s) of the main wireless communication device; and if the first number of reception spatial streams is more than the first number of transmission spatial stream(s), executing a joint transmission procedure which allows the main wireless communication device and an attendant wireless communication device to transmit packets concurrently provided that the sum of the first number of transmission spatial stream(s) and a second number of transmission spatial stream(s) of the attendant wireless communication device is equal to or less than the first number of reception spatial streams.

22. The MIMO wireless communication method of claim 21, wherein the sum of the first number of transmission spatial stream(s) and the second number of transmission spatial stream(s) is equal to or less than a second number of reception spatial streams which another intended receiver in connection with the attendant wireless communication device is operable to process.

23. The MIMO wireless communication method of claim 21, wherein the transmission duration of the main wireless communication device is equal to or longer than the transmission duration of the attendant wireless communication device.

24. A multiple-input multiple-output (MIMO) wireless communication system, comprising:

a first wireless communication device possessing a transmission opportunity to passively start a joint transmission by issuing a distributed MIMO initiation frame and receiving an initial portion from a second wireless communication device, or actively start the joint transmission by issuing the distributed MIMO initiation frame and the initial portion thereafter, or actively start the joint transmission by issuing a distributed MIMO invitation frame and issuing the initial portion; and the second wireless communication device running after the transmission opportunity to participate in the joint transmission by accepting the joint transmission offer from the distributed MIMO initiation frame and issuing the initial portion, or by accepting the joint transmission offer from the distributed MIMO initiation frame and receiving the initial portion from the first wireless communication device, or by accepting the joint transmission offer from the distributed MIMO invitation frame and receiving the initial portion from the first wireless communication device, wherein the distributed MIMO initiation or invitation frame includes a first number of transmission spatial stream(s) of the first wireless communication device and a first number of reception spatial streams which a first receiver in connection with the first wireless communication device is operable to process, and the joint transmission allows the first and second wireless communication devices to transmit distributed MIMO packets concurrently provided that the sum of the first number of transmission spatial stream(s) and a second number of transmission spatial stream(s) of the second wireless communication device is equal to or less than the first number of reception spatial streams.

25. The MIMO wireless communication system of claim 24, wherein the sum of the first number of transmission spatial stream(s) and the second number of transmission spatial stream(s) is equal to or less than a second number of reception spatial streams which a second receiver in connection with the second wireless communication device is operable to process.

26. The MIMO wireless communication system of claim 24, wherein the first and second wireless communication devices reach synchronization, and channel estimation for each of the transmission spatial streams of the first and second wireless communication devices is available to the first receiver or the first and second receivers.

* * * * *